United States Patent
Do

(10) Patent No.: US 8,518,576 B2
(45) Date of Patent: Aug. 27, 2013

(54) SECONDARY BATTERY INCLUDING A SENSOR TO DETERMINE IF BATTERY IS HEATED ABOVE A PREDETERMINED TEMPERATURE

(75) Inventor: Wanseok Do, Suwon-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 326 days.

(21) Appl. No.: 12/797,880

(22) Filed: Jun. 10, 2010

(65) Prior Publication Data

US 2011/0039132 A1 Feb. 17, 2011

Related U.S. Application Data

(60) Provisional application No. 61/232,929, filed on Aug. 11, 2009.

(51) Int. Cl.
*H01M 6/00* (2006.01)

(52) U.S. Cl.
USPC ............ 429/122; 429/131; 429/129; 429/128

(58) Field of Classification Search
USPC ............... 429/7, 122, 131, 128, 129
See application file for complete search history.

(56) References Cited

U.S. PATENT DOCUMENTS 7,479,786 B2 1/2009 Woo et al.

FOREIGN PATENT DOCUMENTS

| JP | 09-061253 | 3/1997 |
|---|---|---|
| JP | 11-149321 | 6/1999 |
| JP | 2001-283828 | 10/2001 |
| JP | 2004-063397 | 2/2004 |
| JP | 2005-287091 | 10/2005 |
| JP | 2005-346943 | 12/2005 |
| KR | 10-2006-0096758 | 9/2006 |

OTHER PUBLICATIONS

KIPO Office Action dated Oct. 24, 2011 for KR Application No. 10-2010-00669943 (3 pages).
Machine English Translation of JP 11-149321 (5 pages).
Machine English Translation of JP 2001-283828 (10 pages).
Machine English Translation of JP 2004-063397 (18 pages).
SIPO Office action dated Oct. 29, 2012, for corresponding Chinese Patent application 201010250717.3, (8 pages).
Patent Abstracts of Japan, and English machine translation of Japanese Publication 2005-346943, previously submitted in an IDS dated Jun. 10, 2010, (14 pages).
SIPO Office action dated Jun. 9, 2013, for corresponding Chinese Patent application 201010250717.3, (9 pages).
Patent Abstracts of Japan, and English machine translation of Japanese Publication 09-061253 dated Mar. 7, 1997, listed above, (11 pages).

*Primary Examiner* — Jane Rhee
(74) *Attorney, Agent, or Firm* — Christie, Parker & Hale, LLP

(57) ABSTRACT

A secondary battery includes at least one bare cell having a first electrode and a second electrode, a Protection Circuit Module (PCM) electrically connected to the first electrode and the second electrode of the bare cell, and an abnormal temperature sensing member provided on a surface of the bare cell and electrically connected to the PCM. The abnormal temperature sensing member is electrically short-circuited when the bare cell is heated above a predetermined temperature.

18 Claims, 10 Drawing Sheets

SECONDARY BATTERY INCLUDING A SENSOR TO DETERMINE IF BATTERY IS HEATED ABOVE A PREDETERMINED TEMPERATURE

CROSS-REFERENCE TO RELATED APPLICATION

This application claims the benefit of U.S. Provisional Application 61/232,929, filed Aug. 11, 2009, in the U.S. Patent and Trademark Office, the disclosure of which is incorporated herein by reference.

BACKGROUND

1. Field

An embodiment of the present invention relates to a secondary battery, and more particularly to a secondary battery that stops charging/discharging of a bare cell when the temperature of the bare cell rises beyond a predetermined temperature.

2. Description of the Related Art

A secondary battery is a unit integrating a bare cell that is an electrical energy source, and a Protection Circuit Module (PCM) that controls charging and discharging of the bare cell. The PCM is provided with a circuit substrate with various circuit devices mounted thereon and coupled to the bare cell. The secondary battery requires a function that stops charging/discharging of the bare cell when the temperature of the bare cell rises beyond a predetermined temperature.

SUMMARY

According to an aspect of the present invention, a secondary battery includes at least one bare cell having a first electrode and a second electrode; a Protection Circuit Module (PCM) electrically connected to the first electrode and the second electrode of the bare cell; and an abnormal temperature sensing member provided on a surface of the bare cell and electrically connected to the PCM, wherein the abnormal temperature sensing member is electrically short-circuited when the bare cell is heated above a predetermined temperature.

According to another aspect of the present invention, the abnormal temperature sensing member may include a first wire; a second wire; and a heat shrink member provided between the first wire and the second wire, wherein the heat shrink member insulates the first wire and the second wire.

According to another aspect of the present invention, the heat shrink member may be formed of one or more of polyethylen terephthalate (PET), polypropylene (PP), polytrimethylene terephthalate (PTT), poly lactic acid (PLA) and oriented polystyrene (OPS).

According to another aspect of the present invention, the abnormal temperature sensing member may be provided in a configuration in which the second wire is wound on the first wire, or the first wire and the second wire are wound on one another.

According to another aspect of the present invention, the abnormal temperature sensing member may include an outer cover enclosing the first wire and the second wire.

According to another aspect of the present invention, the outer cover may have a planar surface portion along a lengthwise direction thereof to make surface contact with the bare cell.

According to another aspect of the present invention, the heat shrink member may be provided as a film having a width greater than a circumference of the first wire, to be wound around the first wire with portions of the heat shrink member overlapping.

According to another aspect of the present invention, the heat shrink member may be provided with a slot extending along a lengthwise direction of the first wire.

According to another aspect of the present invention, the heat sink member includes a plurality of slots separated by a predetermined distance and extending along a lengthwise direction of the first wire.

According to another aspect of the present invention, the heat shrink member may cover the first wire such that a predetermined region of the heat shrink member along a lengthwise direction of the first wire is thinner than other regions of the heat shrink member.

According to another aspect of the present invention, the abnormal temperature sensing member may include a first wire; a second wire; and a heat shrink member at an inner surface thereof, the heat shrink member enclosing the first wire and the second wire, and provided with a projecting portion separating the first wire and the second wire by a predetermined distance.

According to another aspect of the present invention, the abnormal temperature sensing member may include a first wire; a planar or bent plate-type second wire; and a heat shrink member provided between the first wire and the second wire to insulate the first wire and the second wire, and provided with a slot along a center of the second wire.

According to another aspect of the present invention, the abnormal temperature sensing member may include a first wire; a planar or bent plate-type second wire; and a heat shrink member provided between the first wire and the second wire to insulate the first wire and the second wire, and provided with a cut-out line along a center of the second wire.

According to another aspect of the present invention, the bare cells may be provided as cylinder type bare cells, and the secondary battery may be configured as a pack with the cylinder type bare cells arranged.

According to another aspect of the present invention, the heat shrink member is formed of a material with a predetermined heat shrinkage ratio at a predetermined temperature.

According to another aspect of the present invention, the abnormal temperature sensing member includes an outer cover that protects the first and second wires and the heat shrink member.

According to another aspect of the present invention, the outer cover is planar along a surface region that contacts the bare cell.

According to another aspect of the present invention, the heat shrink member has the form of a rectangular film having a width equal to or greater than a circumference of the first wire.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1A:
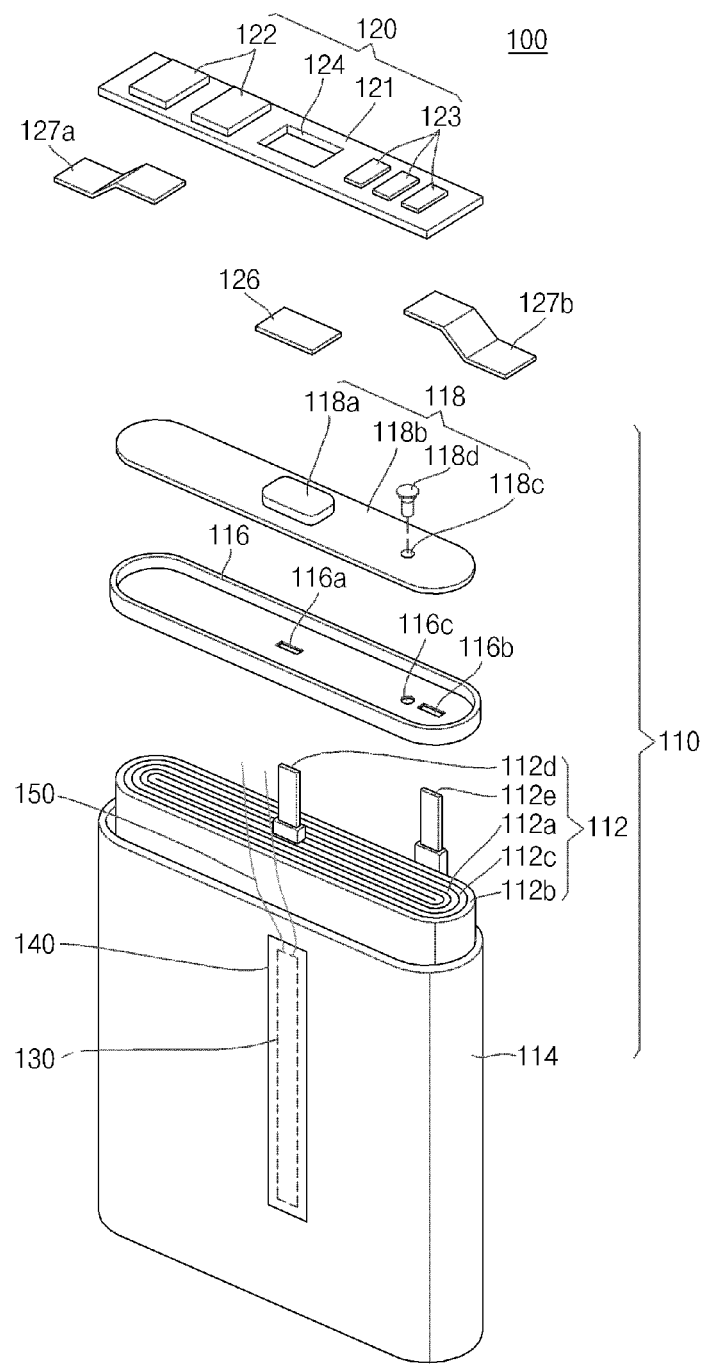
FIGS. 1A and 1B illustrate perspective diagrams of secondary batteries according to embodiments.

Reference will now be made in detail to the present embodiments of the present invention, examples of which are illustrated in the accompanying drawings, wherein like reference numerals refer to the like elements throughout. The embodiments are described below in order to explain the embodiments of the present invention by referring to the figures.

Figure 1B:
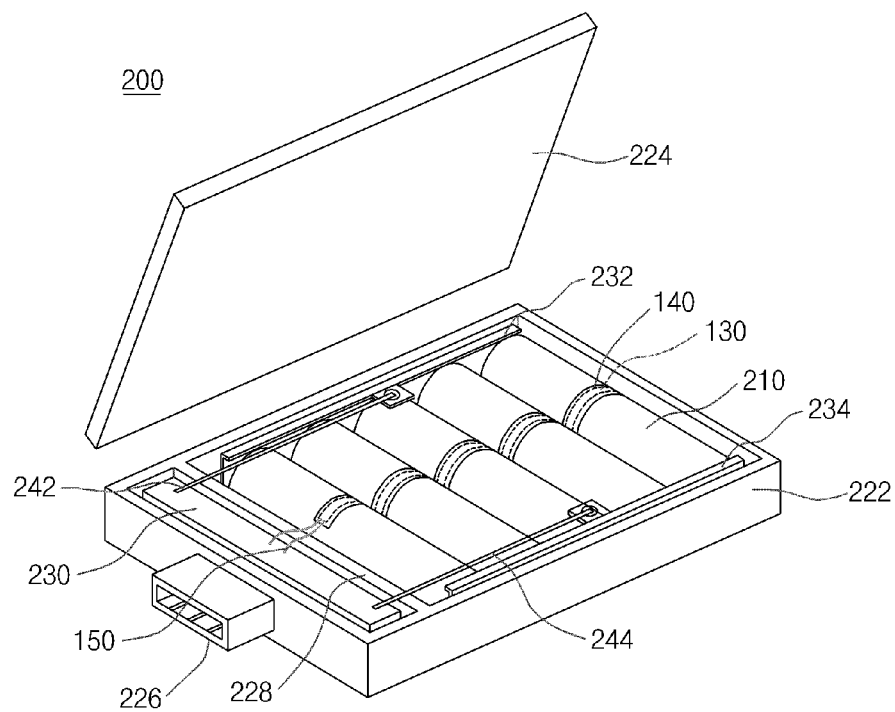

FIGS. 1A and 1B illustrate perspective diagrams of secondary batteries 100, 200, according to an embodiment of the present invention. Referring to FIG. 1A, the secondary battery 100 according to an embodiment of the present invention includes a bare cell 110, a Protection Circuit Module (PCM) 120, and an abnormal temperature sensing member 130. While the secondary battery 100 according to an embodiment of the present invention is illustrated and described in the form of a prismatic type battery for descriptive ease, the invention is not limited thereto, and may relate to various types of secondary batteries, including cylinder type secondary batteries and pouch type secondary batteries, for example.

The bare cell 110 includes an electrode assembly 112, a protection member 114, and a cap plate 118. The electrode assembly 112 includes a first electrode 112a, a second electrode 112b, and a separator 112c interposed between the first electrode 112a and the second electrode 112b. The shown electrode assembly 112 is wound in a jelly-roll type configuration. Alternatively, the electrode assembly 112 may have the first electrode 112a, the separator 112c, and the second electrode 112b stacked in a stack type configuration. The electrode assembly 112 may further include an electrolyte including a liquid, gel and/or solid type electrolyte. The first electrode 112a may be a negative electrode, and the second electrode 112b may be a positive electrode; conversely, the first electrode 112a may be a positive electrode, and the second electrode 112b may be a negative electrode. In the shown embodiment, the first electrode 112a will be described as a negative electrode, and the second electrode 112b will be described as a positive electrode.

The electrode assembly 112 is provided with a first lead 112d electrically connected to the first electrode 112a, and a second lead 112e electrically connected to the second electrode 112b.

The shown protection member 114 is configured as a can that receives the electrode assembly 112. The protection member 114 is provided with an opening at one end, and the electrode assembly 112 is received through the opening.

An insulation case 116 is inserted through the opening of the protection member 114 receiving the electrode assembly 112. The insulation case 116 performs the functions of preventing movement of the electrode assembly 112 within the protection member 114 and providing insulation between a cap plate 118 (to be described) and the electrode assembly 112. The insulation case 116 is provided with a first through-hole 116a and a second through-hole 116b, through which the first lead 112d and the second lead 112e pass, respectively, and an electrolyte injection hole 116c for injecting an electrolyte.

The cap plate 118 covers the opening of the protection member 114 receiving the electrode assembly 112 to seal the protection member 114. The cap plate 118 is provided with an electrode terminal 118a at a predetermined position thereon. The electrode terminal 118a is insulated from a plate terminal 118b occupying the remaining region of the cap plate 118. The cap plate 118 is provided with an electrolyte injection hole 118c at a predetermined location thereof. The electrolyte injection hole 118c is a hole through which electrolyte is injected and is aligned with the electrolyte injection hole 116c. When injection of electrolyte is completed, the electrolyte injection hole 118c is sealed with an injection hole plug 118d. However, it is understood that one or both holes 116c, 118c need not be used in all aspects and can be elsewhere disposed.

The electrode terminal 118a is electrically connected to the first lead 112d of the electrode assembly 112. Also, the plate terminal 118b is electrically connected to the second lead 112e.

The PCM 120 is provided with a circuit board 121, circuit devices 122 and external terminals 123 mounted on the circuit board 121, and a center hole 124 provided in the center of the circuit board 121. The PCM 120 is electrically connected to the bare cell 110 to control charging/discharging and operation of the secondary battery 100. While not required in all aspects, the circuit board 121 can be a printed circuit board (PCB).

The wirings of the circuit board 121 are printed to form an electrical circuit for the devices electrically connected on the circuit board 121. The circuit devices 122 include devices such as a control IC and charge/discharge switch. The external terminals 123 function to connect the secondary battery 100 to an external device or power source and charges/discharges the secondary battery 100. The center hole 124 provides a passage for a laser to pass through when performing laser welding to fasten a first contact member 126 (to be described) to the electrode terminal 118a.

The PCM 120 is electrically connected to the electrode terminal 118a and the plate terminal 118b.

The PCM 120 and the electrode terminal 118a are electrically connected by the first contact member 126. The first contact member 126 is connected to the undersurface of the circuit board 121 through a method such as soldering the edges of both ends thereof to the undersurface, The central region of the first contact member 126 is connected to the electrode terminal 118a using energy such as a laser emitted through the center hole 124 of the circuit board 121.

In addition, the PCM 120 and the plate terminal 118*b* are electrically connected by second contact members 127*a* and 127*b*. The second contact members 127*a* and 127*b* are connected to the plate terminal 118*b* and the PCM 120. The second contact members 127*a* and 127*b* and the plate terminal 118*b* may be fastened through soldering, laser welding, resistance welding, or by using a fastening member such as a bolt.

The second contact members 127*a* and 127*b* and the PCM 120 may be fastened with a method such as soldering.

The protection member 114 is provided with the abnormal temperature sensing member 130 on its surface. The abnormal temperature sensing member 130 may be attached to the surface of the protection member 114 with tape 140, as shown, but the invention is not limited thereto. Double-sided tape may be provided between the abnormal temperature sensing member 130 and the protection member 114 to attach the abnormal temperature sensing member 130 to the surface of the protection member 114. The abnormal temperature sensing member 130 may be attached to the surface of the protection member 114 using an adhesive, such that the tape 140 need not be used in all aspects.

While the abnormal temperature sensing member 130 is illustrated in FIG. 1A as being attached on the front surface of the protection member 114, it may be attached on any surface of the protection member 114 (for example, on either side surface or the bottom surface). Also, while the abnormal temperature sensing member 130 is illustrated in FIG. 1A as being attached parallel to the height axis of the protection member 114, it may alternatively be attached perpendicularly to the height axis of the protection member 114 or at a predetermined oblique angle thereto, and need not be attached in straight disposition. This is because the abnormal temperature sensing member 130 is a component that enables the PCM 120 to sense when the bare cell 110 rises above a predetermined temperature (i.e., when temperature of the bare cell 110 rises higher than predetermined temperature). Upon sensing an abnormal temperature of the bare cell 110, the PCM 120 stops charging/discharging of the bare cell 110.

Here, the abnormal temperature refers to an upper limit of the normal operating temperature range of the secondary battery 100. That is, it refers to a temperature at which the secondary battery does not operate normally, may be liable to explode, etc.

Figure 2A:
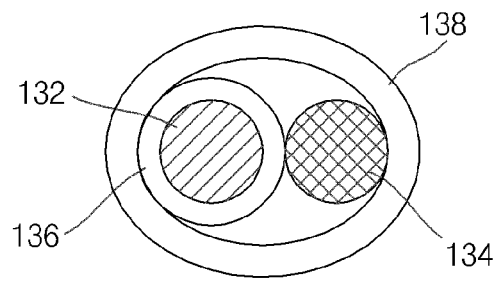
FIGS. 2A to 2C illustrate diagrams of abnormal temperature sensing members that are components of secondary batteries according to embodiments.

An example of the abnormal temperature sensing member 130 shown in FIG. 2A includes a first wire 132 and a second wire 134, and is provided with connecting wires 150 that electrically connect the abnormal temperature sensing member 130 to the PCM 120.

The abnormal temperature sensing member 130 is provided with the first wire 132 and the second wire 134. The first and second wires 132 and 134 are electrically insulated from each other by a heat shrink member 136. With the abnormal temperature sensing member 130, when the bare cell 110 is not heated above a predetermined temperature or does not rise, the first wire 132 and the second wire 134 remain electrically insulated; and when the bare cell 110 is heated above the predetermined temperature or rises, the member 136 shrinks and the first wire 132 and the second wire 134 become short circuited. The short circuit enables the PCM 120 to sense that the bare cell has risen above the predetermined temperature.

The heat shrink member 136 is formed of a material with a predetermined heat shrinkage ratio under a predetermined temperature. The heat shrink member 136 may be one or more of polyethylen terephthalate (PET), polypropylene (PP), polytrimethylene terephthalate (PTT), poly lactic acid (PLA), and oriented polystyrene (OPS).

PET displays a heat shrink ratio of about 45% to about 70% under a temperature of about 100° C., PP displays a heat shrink ratio of about 64% under a temperature of about 120° C. PLA displays a heat shrink ratio of about 75% under a temperature of about 100° C. OPS displays a heat shrink ratio of about 73% to about 75% under a temperature of about 100° C.

Accordingly, in the abnormal temperature sensing member 130, when the heat shrink member 136 reaches a predetermined temperature, the heat shrink member 136 heat shrinks to short circuit the first wire 132 with the second wire 134, enabling the PCM 120 to sense that the bare cell 110 has exceeded a predetermined temperature.

Referring to FIG. 1B, a secondary cell 200 according to another embodiment includes a plurality of bare cells 210, a PCM 230, and an abnormal temperature sensing member 130. The plurality of bare cells 210 may be connected in parallel or in series and placed in a case.

The shown case includes a lower case 222 receiving the bare cells 210, an upper case 224 sealing the lower case 222, and a terminal socket 226 formed on a side of the lower case 222. A partition 228 is at a predetermined position on the upper case 224 or the lower case 222 to partition a space in which the bare cells 210 are received from a space in which the PCM 230 is mounted. The partition 228 prevents movement of the bare cells 210 while preventing damage to the PCM 230 from the bare cells 210. The secondary battery 200 may, of course, be configured with the partition 228 being formed differently or not formed at all. Further, the case can be otherwise constructed.

The bare cells 210 are each formed by winding a first electrode plate, a second electrode plate, and a separator interposed between the first electrode plate and the second electrode plate to provide insulation between the first electrode plate and the second electrode plate, into a jelly-roll type electrode assembly (not illustrated). A can (having the same function as the protection member 114 described above) receives the electrode assembly and is sealed at the top by a can assembly (not illustrated) electrically connected to the electrode assembly. While the bare cells 210 are illustrated as cylinder type bare cells in FIG. 1B, they are not limited thereto and may have different forms, for example, they may be prismatic type bare cells.

The PCM 230 is connected to a first lead plate 232 and a second lead plate 234 which are connected to the plurality of bare cells 210 through a first conducting wire 242 and a second conducting wire 244. The PCM 230 is electrically connected to the bare cells 210 to control charging/discharging processes of the bare cells 210. External terminals, to be connected to terminals of an external device, are formed on the PCM 230 (not shown) and are externally exposed through the terminal socket 226 of the lower case 222. While the plurality of bare cells 210 are illustrated in FIG. 1B as being connected in parallel, the plurality of bare cells 210 may be connected in parallel in groups of a predetermined number, after which the groups may be serially connected. Alternatively, the bare cells 210 may be serially connected in their entirety.

The secondary battery 200 is provided with a plurality of bare cells 210 that yield high electrical charge/discharge capacities, thus enabling the use of the secondary battery 200 as an electric bicycle battery or a battery for devices such as laptop computers that require high capacity batteries.

While not required in all aspects, the abnormal temperature sensing member 130 is attached to surfaces of the bare cells 210 with tape 140. The abnormal temperature sensing member 130 may also be attached to surfaces of the bare cells 210 with double-sided tape between the abnormal temperature sensing member 130 and the surfaces of the bare cells 210. Further, the abnormal temperature sensing member 130 may be attached to surfaces of the bare cells 210 using an adhesive, such that the tape 140 is not needed.

In order to maximize the surface area of the bare cells 210 on which the abnormal temperature sensing member 130 is attached, the abnormal temperature sensing member 130 may be attached following the surface contours of the bare cells 210.

While one abnormal temperature sensing member 130 is illustrated in FIG. 1B as attached to all of the bare cells 210, two or more abnormal temperature sensing members 130 may be used according to requirements, where the bare cells 210 may be divided into groups of 2 or more, and the abnormal temperature sensing members 130 may be attached to surfaces of the groups, respectively. Alternatively, each bare cell 210 could have a corresponding member 130 so as to monitor the bare cell 210 individually.

The abnormal temperature sensing member 130 includes a first wire 132 and a second wire 134 (to be described), and is provided with connecting wires 150 that electrically connect the abnormal temperature sensing member 130 to the PCM module 230.

The abnormal temperature sensing member 130 is provided with the first wire 132 and the second wire 134. The first wire 132 and the second wire 134 are electrically insulated from each other by a heat shrink member 136. If using the abnormal temperature sensing member 130, when any one of the bare cells 210 does not rise above a predetermined temperature, the first wire 132 and the second wire 134 remain insulated; and when any one of the bare cells 210 rises above the predetermined temperature, the first wire 132 and the second wire 134 become short circuited, enabling the PCM 230 to sense that one of the bare cells 210 has risen above the predetermined temperature.

Figure 2B:
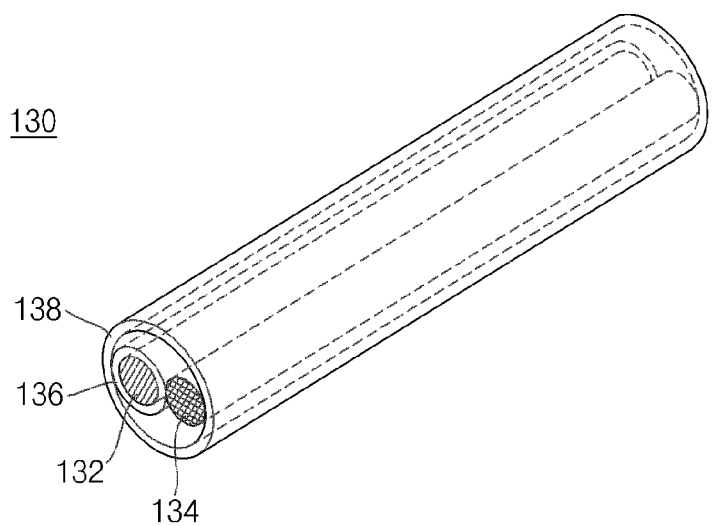
Figure 2C:
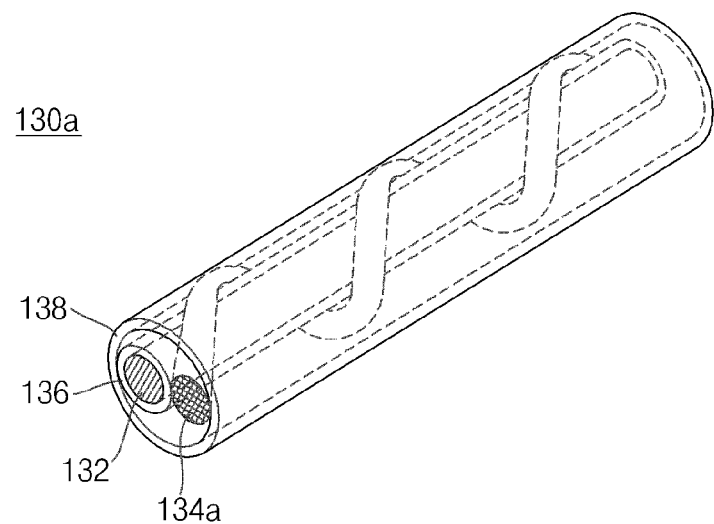

FIGS. 2A to 2C illustrate diagrams of abnormal temperature sensing members according to other embodiments of the present invention. Referring to FIGS. 2A to 2C, the abnormal temperature sensing member 130 primarily includes a first wire 132, a second wire 134, and a heat shrink member 136 that insulates the first wire 132 and the second wire 134 when the bare cell 210 is below a predetermined temperature.

The abnormal temperature sensing member 130 may include an outer cover 138 that protects the first wire 132, the second wire 134, and the heat shrink member 136. The outer cover 138 is also formed of a material with a predetermined heat shrinkage ratio under the predetermined temperature. Therefore, when the bare cells 210 rise above the predetermined temperature, the outer cover 138 presses the first wire 132 and the second wire 134, causing the outer cover 138 to shrink, and the abnormal temperature sensing member 130 is able to react more accurately when the bare cell 210 is heated above a predetermined temperature. While in this embodiment, the outer cover 138 is illustrated in diagrams and is described as a necessary component for the abnormal temperature sensing member 130, it may be removed if not needed and/or made of a non-heat shrinkable material.

The abnormal temperature sensing member 130 illustrated in FIGS. 2A and 2B show the first wire 132 and the second wire 134 side by side, and the heat shrink member 136 provided on the surface of the first wire 132 to provide insulation between the first wire 132 and the second wire 134. In the abnormal temperature sensing member 130a illustrated in FIG. 2C, the second wire 134a is wound about the first wire 132. While not illustrated in the diagram, the first wire 132 and the second wire 134 may be provided in a mutually-winding configuration—that is—a mutually twisted configuration. Therefore, a contacting area of the first wire 132 and the second wire 134 has widened, the abnormal temperature sensing member 130 is able to perceive the predetermined temperature more accurately. In the abnormal temperature sensing members 130 and 130a illustrated in FIGS. 2A to 2C, when the bare cells 110 or 210 rise above a predetermined temperature, the heat shrink member 136 shrinks, causing a predetermined region of the heat shrink member 136 to tear or open, thereby short-circuiting the first wire 132 with the second wire 134 or 134a and enabling the PCM 120 or 230 to sense that the bare cell 110 or 210 has risen beyond a predetermined temperature.

The heat shrink member 136 may shrink along the lengthwise direction of the first wire 132 or along the periphery of the first wire 132, so that a predetermined region or portion of the heat shrink member 136 tears or opens to short-circuit the first wire 132 with the second wire 134 or 134a.

The thickness of the heat shrink member 136 is determined by the predetermined temperature to be sensed by the abnormal temperature sensing member 130, and the type of the heat shrink member 136. That is, because the heat shrink ratio of the heat shrink member 136 varies depending on the type of heat shrink material used (as described above), if the predetermined temperature to be sensed varies, the thickness of the heat shrink member 136 may be varied accordingly. For instance, a heat shrink member 136 formed of OPS (with a relatively higher heat shrink ratio) may be provided thicker than a heat shrink member 136 formed of PET (with a relatively lower heat shrink ratio).

Figure 3:
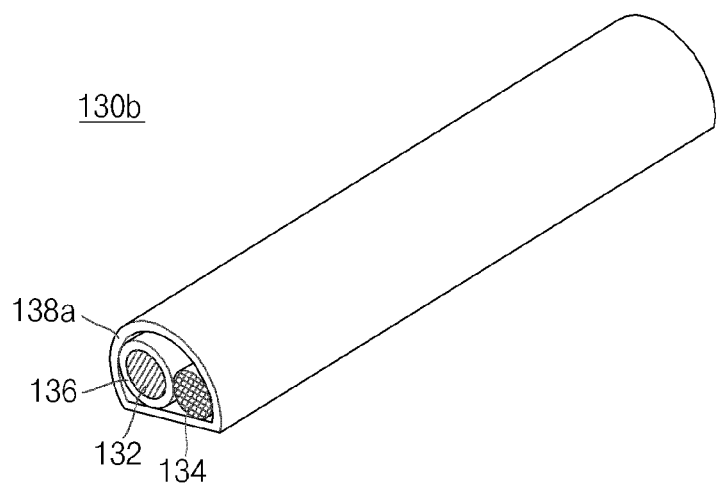
FIG. 3 illustrates an abnormal temperature sensing member of secondary batteries according to another embodiment of the present invention.

FIG. 3 illustrates an abnormal temperature sensing member 130b of secondary batteries according to another embodiment of the present invention. Referring to FIG. 3, the abnormal temperature sensing member 130b has an outer cover 138a that is modified from the cover 138 of the abnormal temperature sensing members 130 and 130a described with reference to FIGS. 2A to 2C. Because the outer cover 138a is different from the cover 138 of the abnormal temperature sensing members 130 and 130a described with reference to FIGS. 2A to 2C, while the remaining elements are generally the same, description of like elements will not be repeated, and only differing elements will be described.

The abnormal temperature sensing member 130b shown in FIG. 3 is provided with the outer cover 138a. The outer cover 138a is configured with its surface region that contacts the bare cell 110 of FIG. 1a formed planar along the lengthwise direction of the first wire 132 or the second wire 134. By forming a surface region of the outer cover 138a, the contacting area of the abnormal temperature sensing member 130b is expanded. Therefore, the abnormal temperature sensing member 130b is able to accurately perceive heat generated in the bare cell 110.

Figure 4A:
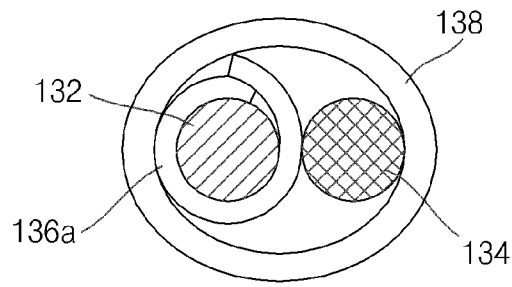
FIGS. 4A and 4B illustrate an abnormal temperature sensing member of secondary batteries according to another embodiment of the present invention.
Figure 4B:
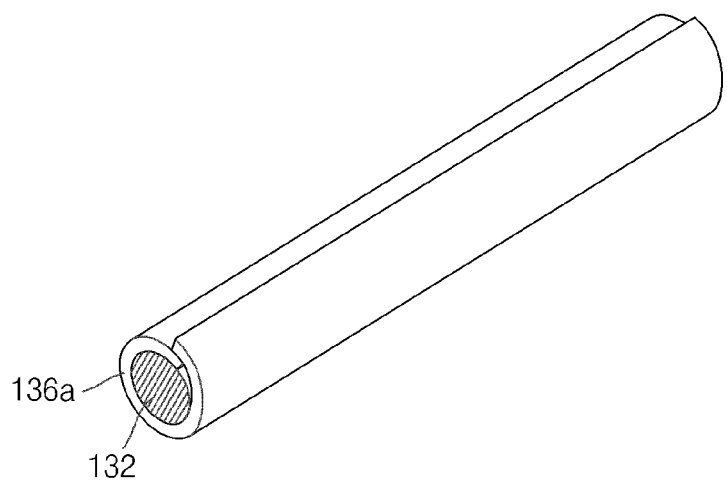

Referring to FIGS. 4A and 4B, an abnormal temperature sensing member 130c according to this embodiment has a heat shrink member 136a that is modified from the member 136 of the abnormal temperature sensing members 130 and 130b described with reference to FIGS. 2A-2C and FIG. 3. Because the heat shrink member 136a is different from the member 136 of the abnormal temperature sensing members 130 and 130b described with reference to FIGS. 2A-2C and FIG. 3, while the remaining elements are the same, description of like elements will not be repeated, and only differing elements will be described.

The abnormal temperature sensing member 130c shown in FIG. 4A includes a heat shrink member 136a, acting as an insulator between the first wire 132 and the second wire 134, that is provided in the form of a rectangular film having a width equal to or greater than the circumference of the first wire 132. The heat shrink member 136a is wound around the first wire 132. While the heat shrink member 136a is illustrated as being wound around the first wire 132, it may alternatively be wound around the second wire 134.

To elaborate, the heat shrink member 136a is provided with either end thereof overlapping one another, so that when heat is applied to the heat shrink member 136a, the heat shrink member 136a shrinks around the first wire 132 in clockwise and counterclockwise directions to expose the first wire 132. The outer cover 138 is formed of a material with a predetermined heat shrinkage ratio under a predetermined temperature.

Figure 5A:
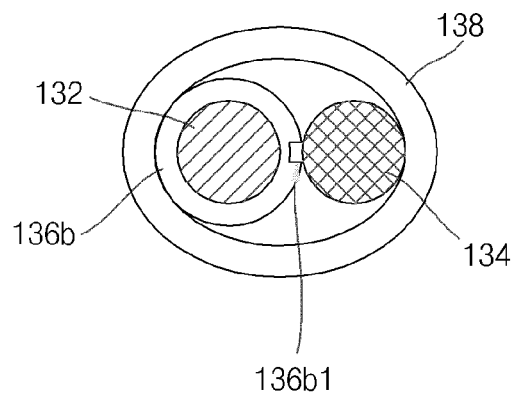
FIGS. 5A to 5C illustrate abnormal temperature sensing members of secondary batteries according to another embodiment of the present invention.
Figure 5B:
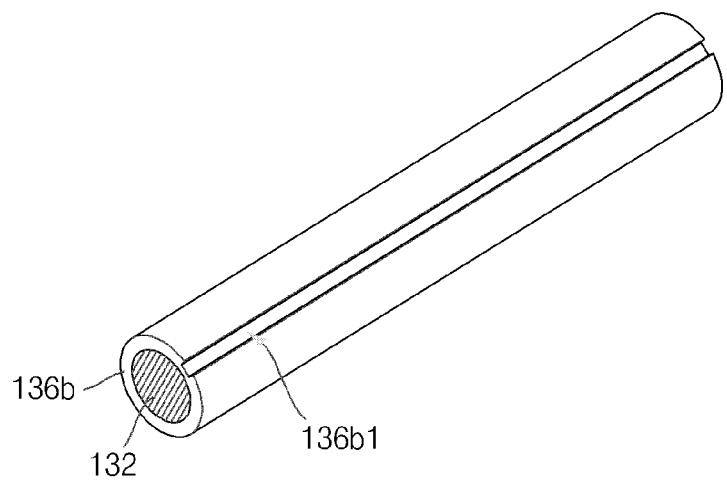
Figure 5C:
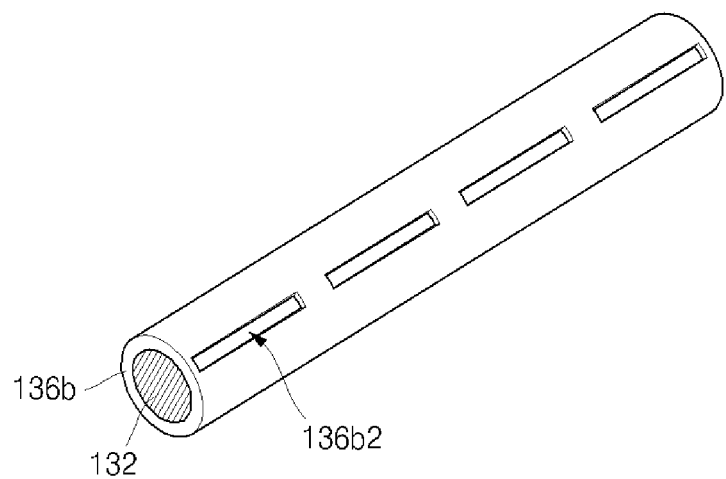

Referring to FIGS. 5A through 5C, an abnormal temperature sensing member 130d according to this embodiment has a heat shrink member 136b that is modified from the members 136, 136a of the abnormal temperature sensing members 130, 130a, and 130b described with reference to FIGS. 2A-2C and FIG. 3. Because the heat shrink member 136b is different from the members 136, 136a of the abnormal temperature sensing members 130, 130a, and 130b described with reference to FIGS. 2A-2C and FIG. 3, while the remaining elements are the same, description of like elements will not be repeated, and only differing elements will be described.

The abnormal temperature sensing member 130d according to this embodiment is provided with a heat shrink member 136b having a slot 136b1, providing insulation between the first wire 132 and the second wire 134. That is, by providing the heat shrink member 136b with the slot 136b1 extending along the lengthwise direction of the first wire 132, the first wire 132 is exposed first at the slot 136b1 when the heat shrink member 136b shrinks. As illustrated in FIG. 5A, the slot 136b1 may be disposed in a region at which the first wire 132 and the second wire 134 are closest to each other. This is to facilitate short-circuiting with the second wire 134 when the first wire 132 is exposed. The outer cover 138 is formed of a material with a predetermined heat shrinkage ratio under a predetermined temperature.

Referring to FIG. 5C, the heat shrink member 136b includes a plurality of slots 136b2 separated by a predetermined distance and extending along a lengthwise direction of the first wire. Similarly to FIG. 5A, the slots 136b2 may be disposed in a region at which the first wire 132 and the second wire 134 are closest to each other, in order to facilitate short-circuiting with the second wire 134 when the first wire 132 is exposed.

Figure 6:
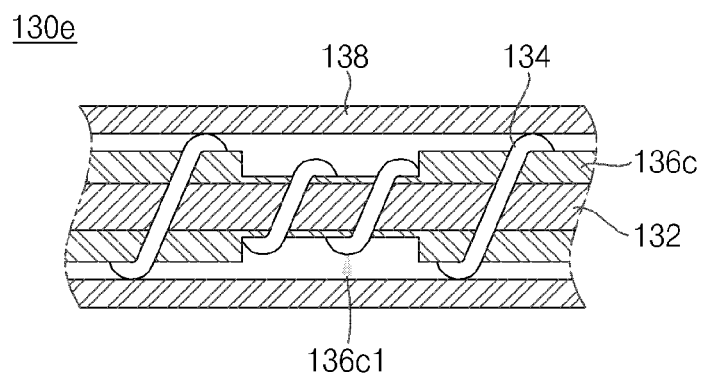
FIG. 6 illustrates an abnormal temperature sensing member of secondary batteries according to another embodiment of the present invention.

Referring to FIG. 6, an abnormal temperature sensing member 130e according to this embodiment has a heat shrink member 136c that is modified from the members 136, 136a of the abnormal temperature sensing members 130a and 130b described with reference to FIGS. 2C and 3. Because the heat shrink member 136c is different from the members 136, 136a of the abnormal temperature sensing members 130a and 130b described with reference to FIGS. 2C and 3, while the remaining elements are generally the same, description of like elements will not be repeated, and only differing elements will be described.

The abnormal temperature sensing member 130e shown in FIG. 6 is provided with a heat shrink member 136c covering the first wire 132, and a predetermined region 136c1 of the heat shrink member 136c is formed thinner than the remaining regions. Also, the abnormal temperature sensing member 130e is provided with the second wire 134 wound about the first wire 132 covered by the heat shrink member 136c.

As illustrated in FIG. 6, the abnormal temperature sensing member 130e has the second wire 134 also wound around the predetermined region 136c1 (that is thinner than the remaining regions) of the heat shrink 136c. Thus, when the heat shrink member 136c shrinks, the first wire 132 covered by the predetermined region 136c1 is exposed first, causing short-circuiting of the first wire 132 with the second wire 134.

Figure 7:
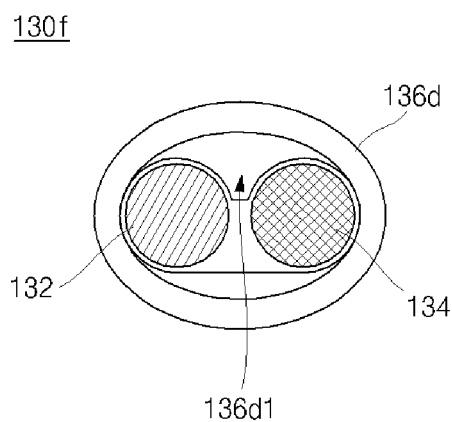
FIG. 7 illustrates an abnormal temperature sensing member of secondary batteries according to another embodiment of the present invention.

Referring to FIG. 7, an abnormal temperature sensing member 130f according to this embodiment is provided with a first wire 132 and a second wire 134. The first wire 132 and the second wire 134 are insulated by a heat shrink member 136d.

The first wire 132 and the second wire 134 are separated and insulated by the heat shrink member 136d. The heat shrink member 136d is provided in a form that encloses the first wire 132 and the second wire 134, and includes a projecting portion 136d1 at the inner surface thereof. The projecting portion 136d1 is provided between the first wire 132 and the second wire 134 to separate the first wire 132 and the second wire 134 by a predetermined distance, thereby insulating the first wire 132 and the second wire 134.

In the abnormal temperature sensing member 130f, when the heat shrink member 136d shrinks due to heat, the first wire 132 and the second wire 134 separated from each other by the projecting portion 136d1 are moved closer together, and after a certain point, the first wire 132 and the second wire 134 contact one another and short circuit. While the abnormal temperature sensing member 130f is illustrated as not including the outer cover 138 in FIG. 7, if the outer cover 138 is necessary, the abnormal temperature sensing member 130f may include the outer cover 138 as being wound around the heat shrink member 136d.

Figure 8A:
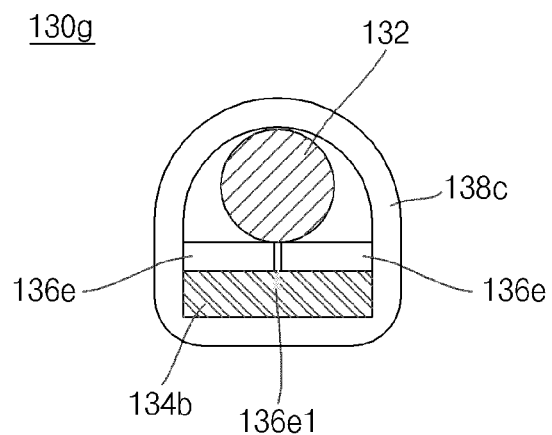
FIGS. 8A and 8B illustrate abnormal temperature sensing members of secondary batteries according to another embodiment of the present invention.
Figure 8B:
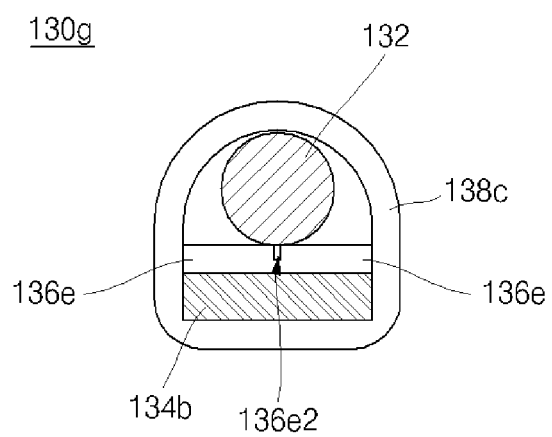

Referring to FIGS. 8A and 8B, an abnormal temperature sensing member 130g according to this embodiment is provided with a first wire 132, a second wire 134b, a heat shrink member 136e, and an outer cover 138b. The second wire 134b is a planar plate type wire. While the second wire 134b is illustrated and described as a planar plate type wire in this embodiment, the first wire 132 may be modified to the form of the second wire 134b (i.e., to be a planar type wire).

A heat shrink member 136e is provided between the first wire 132 and the second wire 134b to insulate the first wire 132 and the second wire 134b. The heat shrink member 136e is provided as a planar plate type to correspond to the second wire 134b. However, it is understood that the member 136e could instead wrap around the first wire 132.

The heat shrink member 136e is provided with a slot 136e2 (illustrated in FIG. 8B) or a cut-out line 136e1 (illustrated in FIG. 8A) along the center of the second wire 134b. While the heat shrink member 136e is illustrated as having the cut-out line 136e1 along the center of the second wire 134b dividing the heat shrink member 136e into two parts, a slot that does not completely bisect the heat shrink member 136e may be alternatively provided.

The abnormal temperature sensing member 130g is provided with the outer cover 138c that covers the first wire 132 and the second wire 134b, and the outer cover 138c is provided in a planar configuration below the second wire 134b (for the same reason pertaining to the outer cover 138a described with reference to FIG. 3).

Referring to FIGS. 8A and 8B, the heat shrink member 136e is provided on the second wire 134b, and heat shrinks upon receiving heat transferred from the second wire 134b. Here, the heat shrink member 136e heat shrinks from the center toward the edges of the second wire 134b and from the edges toward the second wire 134b, and the heat shrinking causes short-circuiting of the first wire 132 with the second wire 134b. Both edges of the heat shrink member 136e are adhered to both edges of the second wire 134b, such that the heat shrink member 136e may be controlled in its heat shrinking directions to heat shrink from the center toward the edges of the second wire 134b.

Figure 9A:
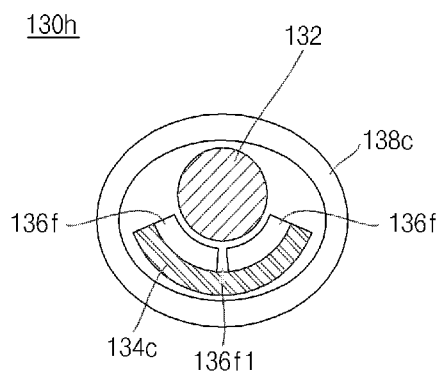
FIGS. 9A and 9B illustrate abnormal temperature sensing members of secondary batteries according to yet another embodiment of the present invention.
Figure 9B:
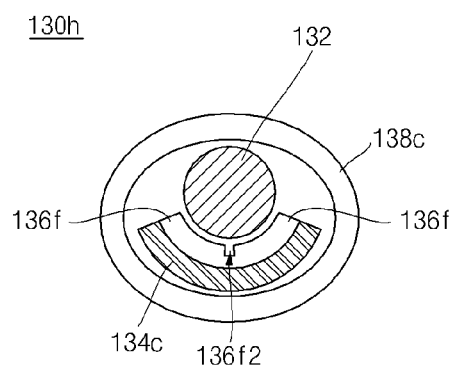

Referring to FIGS. 9A and 9B, an abnormal temperature sensing member 130h according to this embodiment is provided with a first wire 132, a second wire 134c, a heat shrink member 136f, and an outer cover 138c. The abnormal temperature sensing member 130h is different from the abnormal temperature sensing member 130g described with reference to FIGS. 8A and 8B only in terms of the forms of the second wire 134c, heat shrink member 136f, and the outer cover 138c, while remaining elements are the same. Thus, repetitive description of like elements will not be provided, and only differing elements will be described.

As illustrated in FIGS. 9A and 9B, the second wire 134c and the heat shrink member 136f are provided in curved, plate type configurations. The curvatures of the second wire 134c and the heat shrink member 136f are to facilitate contacting of the second wire 134c by the first wire 132 when the second wire 134c is exposed through heat shrinking of the heat shrink member 136f. That is, due to the curvatures of the second wire 134c and the heat shrink member 136f, the first wire 132 is disposed over a slot 136f2 (illustrated in FIG. 9B) or a cut-out line 136f1 (illustrated in FIG. 9A). Thus, when the heat shrink member 136f heat shrinks, the first wire 132 short-circuits with the second wire 134c through the slot 136f2 or the cut-out line 136f1.

Because the second wire 134c is formed as a curved, plate type wire, the portion of the outer cover 138c below the second wire 134c is also curved. The outer cover 138c is formed of a material with a predetermined heat shrinkage ratio under a predetermined temperature.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A secondary battery comprising:
at least one bare cell including a first electrode and a second electrode;
a Protection Circuit Module (PCM) electrically coupled to the first electrode and the second electrode of the bare cell; and
an abnormal temperature sensing member provided on a surface of the bare cell and electrically coupled to the PCM, the abnormal temperature sensing member comprising:
a first wire;
a second wire;
a heat shrink member between the first wire and the second wire, and electrically insulating the first wire and the second wire while the bare cell is below a predetermined temperature and not electrically insulating the first and second wires when the bare cell is above the predetermined temperature; and
an outer cover enclosing the first wire, the second wire, and the heat shrink member, the outer cover being between the at least one bare cell and the first and second wires,
wherein the abnormal temperature sensing member is electrically short-circuited when the bare cell is heated above the predetermined temperature.

2. The secondary battery of claim 1, wherein the heat shrink member is formed of one or more selected from the group consisting of polyethylene terephthalate (PET), polypropylene (PP), polytrimethylene terephthalate (PTT), poly lactic acid (PLA) and oriented polystyrene (OPS).

3. The secondary battery of claim 1, wherein the abnormal temperature sensing member is disposed in a configuration in which the second wire is wound about the first wire.

4. The secondary battery of claim 1, wherein the outer cover has a planar surface portion along a lengthwise direction thereof to make surface contact with the bare cell.

5. The secondary battery of claim 1, wherein the heat shrink member includes a film having a width greater than a circumference of the first wire and is wound around the first wire with portions of the heat shrink member overlapping.

6. The secondary battery of claim 1, wherein the heat shrink member includes a slot extending along a lengthwise direction of the first wire.

7. The secondary battery of claim 1, wherein the heat shrink member includes a plurality of slots separated by a predetermined distance and extending along a lengthwise direction of the first wire.

8. The secondary battery of claim 3, wherein the heat shrink member covers the first wire such that a predetermined region of the heat shrink member along a lengthwise direction of the first wire is thinner than other regions of the heat shrink member.

9. The secondary battery of claim 1, wherein the heat shrink member encloses the first wire and the second wire, and includes a projecting portion separating the first wire and the second wire by a predetermined distance.

10. The secondary battery of claim 1, wherein the second wire is a planar or bent plate-type wire, and the heat shrink member includes a slot aligned with a center of the second wire.

11. The secondary battery of claim 1, wherein the second wire is a planar or bent plate-type wire, and the heat shrink member includes a cut-out line aligned with a center of the second wire.

12. The secondary battery of claim 1, wherein the bare cells are cylinder type bare cells, and the secondary battery is configured as a pack with the cylinder type bare cells arranged therein.

13. A secondary battery comprising:
at least one bare cell including a first electrode and a second electrode;
a Protection Circuit Module (PCM) electrically connected to the first electrode and the second electrode of the bare cell; and
at least one abnormal temperature sensing member provided on a surface of the at least one bare cell and electrically connected to the PCM,
wherein the at least one abnormal temperature sensing member includes first and second wires electrically insulated by a heat shrink member which shrinks when the at least one bare cell is heated above a predetermined temperature to short circuit the first and second wires, and enable the PCM to sense that the at least one bare cell has heated above the predetermined temperature,
wherein the at least one abnormal temperature sensing member further includes an outer cover enclosing the first and second wires and the heat shrink member, the outer cover being between the at least one bare cell and the first and second wires.

14. The secondary battery of claim 13, wherein the heat shrink member is formed of a material with a predetermined heat shrinkage ratio at the predetermined temperature.

15. The secondary battery of claim 13, wherein the outer cover is formed of a material with a predetermined heat shrinkage ratio at the predetermined temperature.

16. The secondary battery of claim 13, wherein the outer cover is planar along a surface region that contacts the bare cell.

17. The secondary battery of claim 13, wherein the heat shrink member has the form of a rectangular film having a width equal to or greater than a circumference of the first wire.

18. The secondary battery of claim 13, wherein the heat shrink member comprises one or more materials selected from the group consisting of one or more of polyethylene terephthalate (PET), polypropylene (PP), polytrimethylene terephthalate (PTT), poly lactic acid (PLA) and oriented polystyrene (OPS).

* * * * *